(12) United States Patent
Murao et al.

(10) Patent No.: US 11,356,436 B2
(45) Date of Patent: Jun. 7, 2022

(54) SINGLE SIGN-ON AUTHENTICATION VIA MULTIPLE AUTHENTICATION OPTIONS

(71) Applicant: SONY CORPORATION, Tokyo (JP)

(72) Inventors: Sadayoshi Murao, Bangalore (IN);
Srinivas Pingili, Bangalore (IN);
Koichi A Ono, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 262 days.

(21) Appl. No.: 16/570,973

(22) Filed: Sep. 13, 2019

(65) Prior Publication Data

US 2021/0084024 A1    Mar. 18, 2021

(51) Int. Cl.
*G06F 21/00* (2013.01)
*H04L 9/40* (2022.01)
*G06F 9/451* (2018.01)

(52) U.S. Cl.
CPC .......... *H04L 63/0815* (2013.01); *G06F 9/451* (2018.02); *H04L 63/102* (2013.01); *H04L 63/0838* (2013.01); *H04L 2463/082* (2013.01)

(58) Field of Classification Search
CPC ............... H04L 63/0815; H04L 63/102; H04L 63/0838; H04L 2463/082; H04L 63/105; H04L 67/02; H04L 63/0807; G06F 9/451; G06F 21/41
See application file for complete search history.

(56) References Cited

U.S. PATENT DOCUMENTS 10,764,752 B1 *   9/2020   Avetisov ............... H04L 63/062
2015/0254672 A1   9/2015   Huesch et al.
2017/0289134 A1   10/2017  Thomas et al.
2018/0139199 A1 * 5/2018   Ahuja ................... H04L 63/083
2019/0281028 A1 * 9/2019   Gillan .................. H04L 63/0861
2021/0176059 A1 * 6/2021   Hertrich ............... H04L 9/3073

FOREIGN PATENT DOCUMENTS

| CA | 3035817 A1 | 9/2019 |
| GB | 2509895 A | 7/2014 |
| WO | 2014/080167 A1 | 5/2014 |
| WO | 2018126075 A1 | 7/2018 |

OTHER PUBLICATIONS

Sebastián Peyrott, "Authentication: Ethereum and Smart Contracts, Part 3" Jun. 8, 2017, 13 pages.
International Search Report of PCT Application No. PCT/JP2020/032878, dated Oct. 29, 2020, 05 pages of ISR.

\* cited by examiner

Primary Examiner — Kendall Dolly
(74) Attorney, Agent, or Firm — Chip Law Group

(57) ABSTRACT

A hybrid authentication system, a method, and a non-transitory computer-readable medium for single-sign-on authentication is provided. The hybrid authentication system is communicatively coupled to a web application server and a public ledger. The hybrid authentication system receives a request from the web application server to access secure content on a resource server and controls display of a set of user-selectable options on a user interface of a user device based on the received request. The hybrid authentication system selects at least one authentication option from the displayed set of user-selectable options and authenticates the received request based on the selected at least one authentication option. The selection of the at least one authentication option is based on a user input over the displayed set of user-selectable options.

19 Claims, 9 Drawing Sheets

SINGLE SIGN-ON AUTHENTICATION VIA MULTIPLE AUTHENTICATION OPTIONS

CROSS-REFERENCE TO RELATED APPLICATIONS/INCORPORATION BY REFERENCE

None.

FIELD

Various embodiments of the disclosure relate to authentication technology. More specifically, various embodiments of the disclosure relate to a system and a method for single-sign-on (SSO) authentication via multiple authentication options.

BACKGROUND

Advancements in authentication technology have provided users with various authentication options. Conventionally, in some instances, a user can choose to use a single-sign-on (SSO) functionality whereby the user has the flexibility to sign-on to different applications based a single user account (e.g., an email or a social media account). In some other instances, multiple authentication options are also incorporated to add an additional layer of abstraction and security for authentication in less secure environments. For example, a two-factor authentication via the SSO authentication option and a one-time-password (OTP) based authentication option. Most of the conventional authentication options happen to either authenticate users in a less secure manner which in many instances leaves a possibility of a loss of critical or non-critical user information or create undesired or unacceptable hassles for users.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for single-sign-on (SSO) authentication via multiple authentication options, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed system and method for single-sign-on (SSO) authentication via multiple authentication options. Exemplary aspects of the disclosure provide a hybrid authentication system for SSO authentication. The hybrid authentication system may be a Single Sign-in system that provides a user with multiple authentication options for a web application. By way of example, the hybrid authentication system provides two authentication options, namely a web-based authentication and a wallet-based authentication. The web-based authentication may be based on the Oauth protocol, whereby an identity provider, such as an Oauth server, may be responsible for authentication of requests to access user-specific information on resource servers (also referred to as API servers). Whereas, the wallet-based authentication may be based on a smart contract stored on a public ledger and a public key of a user's wallet account on the public ledger.

The hybrid authentication system provides a flexibility to a user to select two-factor authentication or one of the two-factor authentication, i.e. one of or both web-based authentication and wallet-based authentication. For example, the user has the flexibility to SSO to the web application using usual login credentials (e.g., an Email ID/phone number and a password) or the user can SSO to the web application by logging to the user's wallet account on the public ledger using a wallet ID and a private key for the user's wallet account. Additionally, or alternatively, security criteria may be defined based on whether to select two-factor authentication or one of the two-factor authentication. By way of example, the security criteria may include a defined security level (e.g., a user-defined security level) for a specific web application hosted on a web application server, a user preferred authentication for the specific web application, or a failure status of the authentication attempted previously based on one of the web-based authentication or the wallet-based authentication. For SSO access based on the wallet-based authentication, an initialized session on a web client of the user device may be issued a session ID as that for a session initialized based on a web-based login. Thus, after sign-on to the web application, the state of the client-end interface may remain same for the user, notwithstanding the selection of either of the authentication options.

Figure 1:
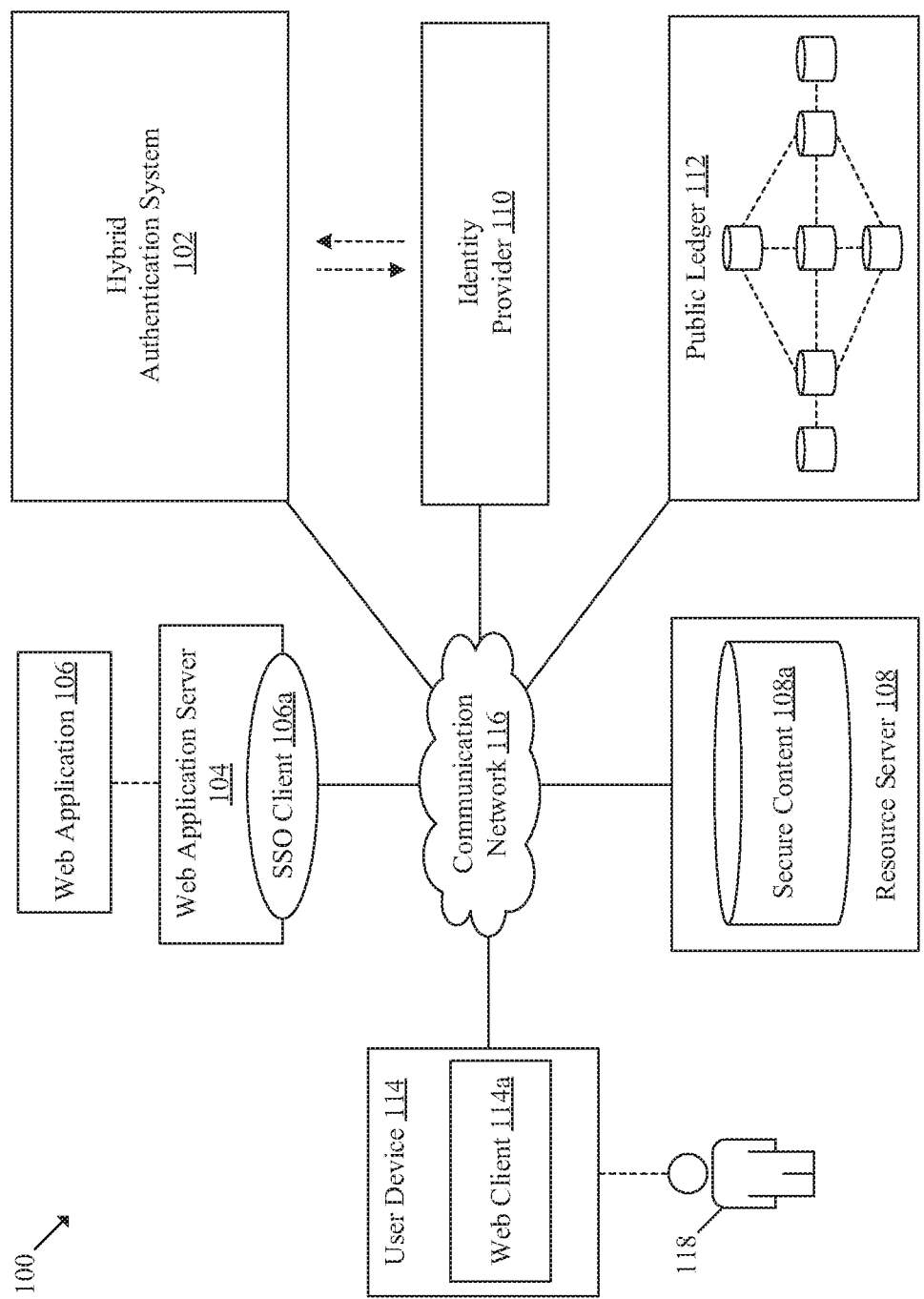
FIG. 1 is a diagram that illustrates an exemplary network environment for SSO authentication via multiple authentication options, in accordance with an embodiment of the disclosure.

FIG. 1 is a diagram that illustrates an exemplary network environment for SSO authentication via multiple authentication options, in accordance with an embodiment of the disclosure. With reference to FIG. 1, there is shown a network environment 100. The network environment 100 includes a hybrid authentication system 102, a web application server 104, and a web application 106 hosted on the web application server 104. Additionally, an SSO client 106a may reside on the web application 106. The network environment 100 further includes a resource server 108, an identity provider 110, a public ledger 112, and a user device 114 that hosts a web client 114a, for example, a web browser. The network environment 100 further includes a communication network 116. The communication network 116 may be established among two or more computing devices of the network environment 100. By way of example, the communication network 116 may be among the hybrid authentication system 102, the web application server 104, the identity provider 110, the resource server 108, the public ledger 112, and the user device 114. There is further shown a user 118 associated with the user device 114.

The hybrid authentication system 102 may include suitable logic, circuitry, and interfaces that may be configured to execute operations related to identity (ID) management for users and/or web applications requesting access to the secure content 108a on the resource server 108. The hybrid authentication system 102 may be configured to manage authentication process and/or authentication levels (e.g., single-factor or two-factor authentication) for requests to access the secure content 108a. By way of example, the request may be provided by the web application server 104 based on a user-initiated request for a SSO access to at least one web application (such as the web application 106) hosted on the web application server 104. Additionally, the hybrid authentication system 102 may handle operations associated with maintenance of authentication state of the request and access-profile management for users and/or web applications. Examples of the hybrid authentication system 102 may include, but are not limited to, a server, a distributed network of servers, a computing device, a mainframe machine, a computer work-station, and/or a consumer electronic (CE) device.

The web application server 104 may include suitable logic, circuitry, and interfaces that may be configured to host one or more web applications. By way of example, the web application server 104 may host a server-side logic, a server-side program, and application data for the web application 106. Whenever the user 118 requests the web application server 104 to access a functionality of the web application 106 via the web client 114a, the web application server 104 executes the server-side program and the server-side logic for the web application so as to fulfill the request. Examples of the web application server 104 may include, but are not limited to, a server, a computing device, a mainframe machine, a computer work-station, and/or a CE device.

The web application 106 may be a client-server computer-implemented program and may include, for example, a client-side interface, a client-side logic, a server-side program, and a server-side logic. The web application 106 may be one of the one or more web applications hosted on the web application server 104. By way of example, the client-side interface may be a web-page loaded on the web browser and the client-side logic may be a program that uses web technology, such as ASP, JSP/Java, Node.js, PHP, or Python, to receive requests from the web-page and to process the requests as queries, updates or actions for the server-side program. Examples of the web application 106 may include, but are not limited to, a webpage-based application that loads up in a web browser, a mobile application, a native web application, a desktop-based web application.

The SSO client 106a may provide an interface to the hybrid authentication system 102 for access, interactivity, and/or exchange of information with the web application 106 and/or the web client 114a of the user device 114. By way of example, the SSO client 106a may provide a set of services related to SSO access to the user 118 via a web browser (i.e. the web client 114a). An SSO agent (not shown in FIG. 1) on the hybrid authentication system 102 may communicate with the SSO client 106a. By way of example, the SSO client 106a may enable the hybrid authentication system 102 to retrieve user credentials from the web client 114a of the user device 114 or to push a user interface that triggers the user 118 to provide the user credentials for SSO access to the web application 106.

The resource server 108 may include suitable logic, circuitry, and interfaces that may be configured to store the secure content 108a, for example, the user-specific information or Personal Identifiable Information (PII) associated with the user 118. The secure content 108a may be sufficient to establish identity of the user 118. By way of example, as per Oauth 2.0, the resource server 108 may be referred to as an application-programming interface (API) server and may handle requests related to authentication of web applications having valid access credentials to access the secure content 108a.

The identity provider 110 may be a server, a network of servers, an online service, or a website that issues access credentials on behalf of the user 118 to the web application 106 so as enable the web application 106 to access the secure content 108a on the resource server 108. In certain instances, the identity provider 110 may be responsible for management of the resource server 108 and may offer SSO-as-a-service to the web application 106 as a client. For Oauth-based authentication, the identity Provider 110 may be an Oauth Server which may issue access credentials on behalf of the user 118 to the web application 106. Examples of the identity provider 110 may include, but are not limited to, email-service providers, social-media networks, or other web-based login services.

The public ledger 112 may be a decentralized, distributed, and public database system that maintains an immutable record of data operations or transactions. A set of data operations may be grouped together as a block and may be further linked to a previous block of data operations to form a chain. All blocks of data operations may be stored in a decentralized manner, whereby all participants or public nodes store all the blocks. The public ledger 112 may include an operating system which may allow for deployment of a smart contract between two or more parties, for example, between the web application 106 and the hybrid authentication system 102. Herein, the smart contract may be referred to as a self-executable program or a computer code that may run on the public ledger 112 and may include a set of conditions under which two or more parties to the smart contract agree to interact with each other. The smart contract may be stored at a specific address on the public ledger 112 and may be a collection of the computer code (i.e. functions) and data (i.e. the state of account).

By way of example, the public ledger 112 may be an Ethereum blockchain which uses accounts as state objects and a state of each account may be tracked by the Ethereum blockchain. Herein, the accounts represent identities of users, mining nodes, or automated agents. All the blocks of data operations or the smart contract may be associated with the accounts on the Ethereum Blockchain.

The user device 114 may include suitable logic, circuitry, and interfaces that may be configured to access the web application 106 via the web client 114a on the user device 114. For example, the web client 114a may be a web browser that loads up a client-side interface of a multimedia streaming application. The web client 114a on the user device 114 may have provisions to generate a user-initiated request for SSO access to the multimedia streaming application based on identity information/credentials of the user 118, as maintained on the resource server 108 by the identity provider 110, for example, a social media service or an email service. The user device 114 may include suitable Input/output (I/O) functionality and networking functionality to facilitate a communication of the web client 114a with the web application server 104 and/or the hybrid authentication system 102. Examples of the user device 114 may include, but is not limited to, a computing device, a mobile phone, a smart phone, a computer work-station, and/or any CE device.

The web client 114a may be a computer application, such as a web browser on the user device 114. The web client 114a may correspond to a platform on the user device 114 to access a client-side interface of the web application 106 hosted on the web application server 104.

The communication network 116 may include a communication medium through which the hybrid authentication system 102, the web application server 104, the resource server 108, the identity provider 110, the public ledger 112, and the user device 114 may communicate with each other. Examples of the communication network 116 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 116, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the web application server 104 may host one or more web applications, such as the web application 106. On the user device 114, the web client 114a may receive a first user input (e.g., a Uniform Resource Locator (URL) of the web application) to access the client-side interface of the web application 106. Once the client-side interface is loaded and displayed on a user interface (UI) of the user device 114, the web client 114a may receive a second user input as a request for SSO access to the web application 106, via the client-side interface. The second user input may be provided to trigger a process for the SSO access to the web application 106 and to gain access to a plurality of systems or services associated with the web application 106 using a single sign-on credential provided by the identity provider 110.

The web application server 104 may receive a user-initiated request for the SSO access to the web application 106. Based on the user-initiated request, the web application server 104 may further generate and transmit a request to the hybrid authentication system 102. The request may be transmitted to initiate an authentication process so as to access the secure content 108a on the resource server 108. The secure content 108a may include user-specific information, such as user name, Email-ID, age, gender, Date of Birth (DOB), user location, and the like. The web application server 104 may need access to the user-specific information so as to login or sign-up the user 118 for the web application 106 and/or to create/verify the identity of the user 118.

The hybrid authentication system 102 may be configured to receive the request from the web application server 104 to access the secure content 108a. The hybrid authentication system 102 may be further configured to control display of a set of user-selectable options on a UI of the user device 114 based on the received request from the web application server 104. As an example, the UI may be a web page or a popup window that displays the set of user-selectable options. The set of user-selectable options may include a web-based authentication option and a wallet-based authentication option. The web-based authentication option may be based on the Oauth (e.g., Oauth 2.0) Protocol. Similarly, the wallet-based authentication option may be based on a smart contract stored on the public ledger 112. In some exemplary embodiments, the set of user-selectable options may also include an option for a two-factor authentication of the received request. Such an option may include both the web-based authentication and the wallet-based authentication.

The hybrid authentication system 102 may be further configured to select one or more authentication options from the displayed set of user-selectable options based on a user input over the displayed set of user-selectable options. Additionally, or alternatively, one or more authentication options may be selected from the displayed set of user-selectable options based on defined security criteria for the web application 106. By way of example, the defined security criteria may include a defined security level for the web application 106 hosted on the web application server 104. The defined security criteria may be used to determine whether to further select a single factor authentication or a two-factor authentication for the request initiated by the web application server 104. In certain exemplary scenarios, for the two-factor authentication, other authentication options, for example, one-time-password (OTP)-based authentication or Pin-based authentication, may be selected as a secondary authentication factor with the selected authentication option as the primary authentication factor. Additionally, or alternatively, the defined security criteria may include a user preferred authentication scheme for the specific web application. As an example, based on historical user preference or historical selections of authentication options, a record of the user preferred authentication options for different web applications may be maintained by the hybrid authentication system 102.

Additionally, or alternatively, the defined security criteria may include a failure status of authentication attempted previously based on one of the web-based authentication option or the wallet-based authentication option. For example, historical records of authentication failures and/or logs of failed attempts to authenticate the request of the web application server 104 using the web based authentication option may be analyzed to select the wallet-based authentication option as the authentication option and to reattempt the authentication based on the wallet-based authentication option.

By way of example, the hybrid authentication system 102 may detect a security level for the web application 106. This may be based on a web-application configuration pre-defined to handle different authentication options for the web application 106. The web-application may authenticate the user 118 based on a Web identifier (ID) for a web account (e.g., a social media account), a wallet account of the user 118 on the public ledger 112, or a combination of both the Web ID and the wallet account on the public ledger 112. Herein, the web-ID may be a pre-specified Uniform Resource Identifier (URI) and may include a string of characters which may be used to identify a web account of the user 118 unambiguously.

The hybrid authentication system 102 may be further configured to authenticate the received request based on the selected authentication option. Details of the authentication for the selected authentication option are briefly described herein.

In case the web-based authentication option is selected, the hybrid authentication system 102 may communicate a token request to the identity provider 110 that manages the web account of the user 118. For example, the token request may be provided to a social media service (as the identity provider 110) that manages the social media account (i.e. the web account) of the user 118. The hybrid authentication system 102 may receive the access token from the identity provider 110 based on the authentication of the communicated token request by the identity provider 110. The received request may be authenticated based on the received access token for the selected web-based authentication option. Based on the authentication of the received request, the hybrid authentication system 102 may issue the access token to the web application server 104. The access token may include a unique string which may indicate that the bearer of the access token is authorized to access the resource server 108 and allowed to execute specific operations (e.g., data retrieval) on the resource server 108, as per a set of permissions defined for the issued access token. In certain instances, the token request may be part of the Oauth 2.0 protocol (hereinafter, referred to as Oauth protocol), which may refer to an open standard for token-based authentication and authorization and provides a standard way to access services that require user authorization API for the web application 106. As Oauth protocol is known to one ordinarily skilled in the art; therefore, details of the Oauth protocol are omitted from the disclosure for the sake of brevity.

In case the wallet-based authentication option is selected, the hybrid authentication system 102 may initiate an authentication process that relies on established link(s) between the web ID (of the web account) and the wallet account of the user 118 on the public ledger 112.

It should be noted here that to have SSO access to the web application, the hybrid authentication may need to ensure that pre-established links exist between one or more web IDs and the wallet account. Therefore, before authentication process is initiated, the hybrid authentication system 102 may initiate a process to link the Web ID with the wallet account. As part of the process, the hybrid authentication system 102 may create a hybrid ID which may be linked with the public key and stored on the public ledger 112. The hybrid ID may include identifiers which indicate that the web ID for the web account of the user 118 is linked to the wallet account.

In order to link the web ID with the wallet account, a smart contract will be written and made accessible by the Hybrid authentication system 102. At the time of wallet linking with web-ID, the hybrid authentication system 102 may also initiate a transaction via the smart contract to update the public ledger 112 with linking information for the wallet account and the web ID. This linking information may be related to the wallet account and the web account of the user 118 and may include, for example, a hybrid ID for the user 118, the public key for the wallet account (e.g., Ethereum Wallet Account), the web ID for the web account (e.g., a Social Media Account), and a user identifier. In certain instances, the user 118 may be provided with options to link multiple web accounts (or multiple web-IDs) to the same wallet account so as to allow the user 118 to select any suitable web-ID for SSO access to the web application 106. The linking of the wallet account with the web-ID(s) is described in detail, for example, in FIG. 3A and FIG. 3B.

As part of the authentication process, the hybrid authentication system 102 may control display of a UI form on the user device 114 based on the selection of the wallet-based authentication option. In response, the user 118 may provide approval to sign a message via the UI form and share a signature with the hybrid authentication system 102. The hybrid authentication system 102 may receive the signature signed with a private key of the wallet account and call the smart contract stored on the public ledger 112 based on the received signature. Once the smart contract is called, the public ledger 112 may use the smart contract to validate the received signature with the public key (or a hash of the public key/wallet ID) of the wallet account and authenticate the received request based on the validation of the received signature. Based on the authentication of the received request, the public ledger 112 may return the hybrid ID to the hybrid authentication system 102. The hybrid authentication system 102 may issue the access token to the web application server 104 based on the returned hybrid ID.

The web application server 104 may receive the access token from the hybrid authentication system 102, via the SSO client 106a. Thereafter, the web application server 104 may access the secure content 108a on the resource server 108 using the issued access token. By way of example, the resource server 108A may receive the access token from the web application server 104 to access the secure content 108a and may initiate a verification of the received access token with the hybrid authentication system 102. The resource server 108 may validate the request to access the secure content 108a based on the verification of the received access token by the hybrid authentication system 102. The web application server 104 may initialize a session of the web application 106 on the web client 114a of the user device 114 based on the accessed secure content 108a. The web application 106 may assign a session ID to the initialized session on the web client 114a on the user device 114. The assigned session ID may be the same as that for a web-based sign-in to the web application 106.

In some exemplary embodiments, the hybrid authentication system 102 may be further configured to construct a user profile image based on the authentication of the received request. The user profile image may include an application Uniform Resource Locator (URL) for the web application 106 hosted on the web application server 104, an authentication type, an identity provider name, an expiration time pre-assigned to an access token, and a re-certification status. For example, the user profile image for the user 118 may include the URL for the web application 106 hosted on the web application server 104 via the web client 114a. The user profile image for the user 118 may further include the authentication type which may be specify the authentication option(s) to be selected for the authentication of requests from a specific web application. For example, the authentication type may be a web-based authentication, a wallet-based authentication, or both the web-based authentication and the wallet-based authentication. The user profile image for the user 118 may further include a name of the identity provider 110 and an expiration time pre-assigned to the access token provided by the identity provider 110. The user profile image for the user 118 may further include the re-certification status that indicates whether a recertification for the SSO access is required or not required for the user 118 in future.

An example of the user profile image is provided in Table 1, as follows:

TABLE 1

User Profile Image for Hybrid Authentication Setup

| Application URL | Authentication Type | Web Account (Web IDs) | Expiration Time | Re-certification (SSO) |
|---|---|---|---|---|
| http://123.com | Both (Web, Wallet) | ID_Provider_1, ID_Provider_2 | 72 Hours | Mandatory |
| http://abc.com | Wallet Only | ID_Provider_3, ID_Provider_2 | 0.5 Hour | None |
| http://xyz.com | One of (Web, Wallet) | ID_Provider_4 | 12 Hours | None |

In Table 1, the web account (ID_Provider_1, ID_Provider_2, ID_Provider_3, and ID_Provider_4) may correspond to multiple identity providers. Corresponding web accounts (or web-IDs) of the multiple identity providers may be linked to the wallet ID or wallet address of the user's wallet account so as to allow the user 118 to select SSO authentication via different web accounts/web-IDs.

In at least one embodiment, the hybrid authentication system 102 may wait till the expiration time of the access token to check whether the access token is expired and a new access token is to be requested from the identity provider 110. In case a new SSO request is received from the web application server 104 after the expiration time, the hybrid authentication system 102 may prompt the user 118 to reinitiate the authentication process based on selection of one of or both the web-based authentication option and the wallet-based authentication option.

Figure 2:
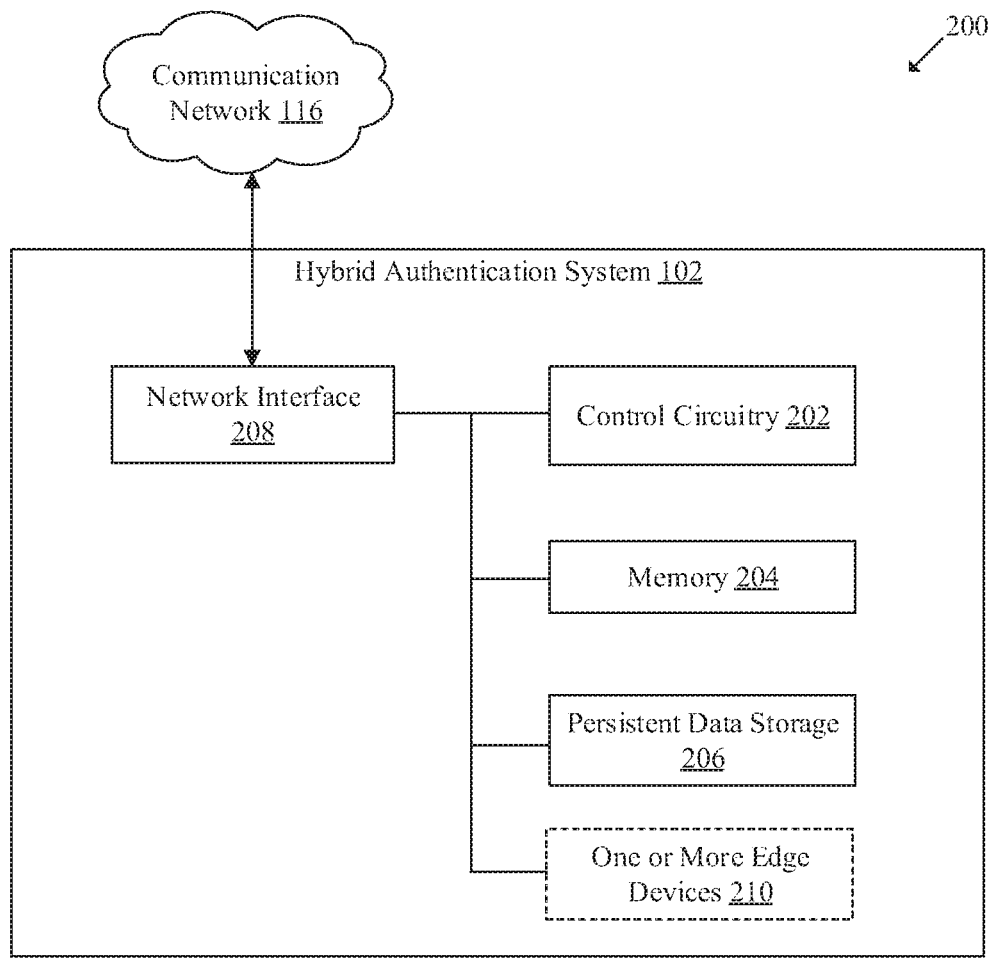
FIG. 2 is a block diagram that illustrates an exemplary hybrid authentication system for SSO authentication via multiple authentication options, in accordance with an embodiment of the disclosure.

FIG. 2 is a block diagram that illustrates an exemplary hybrid authentication system for SSO authentication via multiple authentication options, in accordance with an embodiment of the disclosure. FIG. 2 is explained in conjunction with elements from FIG. 1. With reference to FIG. 2, there is shown a block diagram 200 of the hybrid authentication system 102. The hybrid authentication system 102 may include control circuitry 202, a memory 204, and a persistent data storage 206 and a network interface 208. The control circuitry 202 may be configured to communicate with the web application server 104, the resource server 108, the public ledger 112, the identity provider 110, and the user device 114 by use of the network interface 208.

The control circuitry 202 may comprise suitable logic, circuitry, and interfaces that may be configured to receive the request from the web application server 104 to access the secure content 108a on the resource server 108. The control circuitry 202 may be further configured to select one or more of the web-based authentication option and the wallet-based authentication option for authentication of the received request. The control circuitry 202 may be further configured to authenticate the received request based on the selected authentication option and issue an access token to the web application server.

The control circuitry 202 may include one or more processors configured to execute instructions stored in the memory 204 and may include one or more specialized processing units, which may be implemented as a separate processor in the hybrid authentication system 102. The control circuitry 202 may be implemented based on a number of processor technologies known in the art. Examples of implementations of the control circuitry 202 may be an x86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a Graphics Processing Unit (GPU), and/or other control circuits.

The memory 204 may comprise suitable logic, circuitry, and interfaces that may be configured to store program instructions executable by the control circuitry 202. In certain embodiments, the memory 204 may be configured to store operating systems and associated application-specific information. The memory 204 may include computer-readable storage media for carrying or having computer-executable instructions or data structures stored thereon. Such computer-readable storage media may include any available media that may be accessed by a general-purpose or special-purpose computer. Such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the control circuitry 202 to perform a certain operation or group of operations associated with the hybrid authentication system 102.

The persistent data storage 206 may comprise suitable logic, circuitry, and interfaces that may be configured to store program instructions executable by the control circuitry 202, operating systems, and/or application-specific information, such as logs and application-specific databases. The persistent data storage 206 may include computer-readable storage media for carrying or having computer-executable instructions or data structures stored thereon. Such computer-readable storage media may include any available media that may be accessed by a general-purpose or special-purpose computer. By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the control circuitry 202 to perform a certain operation or group of operations associated with the hybrid authentication system 102.

The network interface 208 may comprise suitable logic, circuitry, and interfaces that may be configured to facilitate communication between the hybrid authentication system 102, the web application server 104, the resource server 108, the identity provider 110, the public ledger 112, and the user device 114, via the communication network 116. The network interface 208 may be implemented by use of various known technologies to support wired or wireless communication of the hybrid authentication system 102 with the communication network 116. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN).

The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

In some exemplary embodiments, the hybrid authentication system 102 may further include one or more edge devices 210 which may be configured to perform the wallet-based authentication of the request from the web application server 104. Each edge device of the one or more edge devices 210 may be provide an entry point into an enterprise or a service provider core network. The one or more edge devices 210 may include, for example, a router, a routing switch, an integrated access device (IAD), multiplexer, and a variety of MAN and WAN access device. The operations executed by the control circuitry 202 are described in detail, for example, in FIG. 3A, FIG. 3B, FIG. 4A, FIG. 4B, FIG. 4C, and FIG. 5.

Figure 3A:
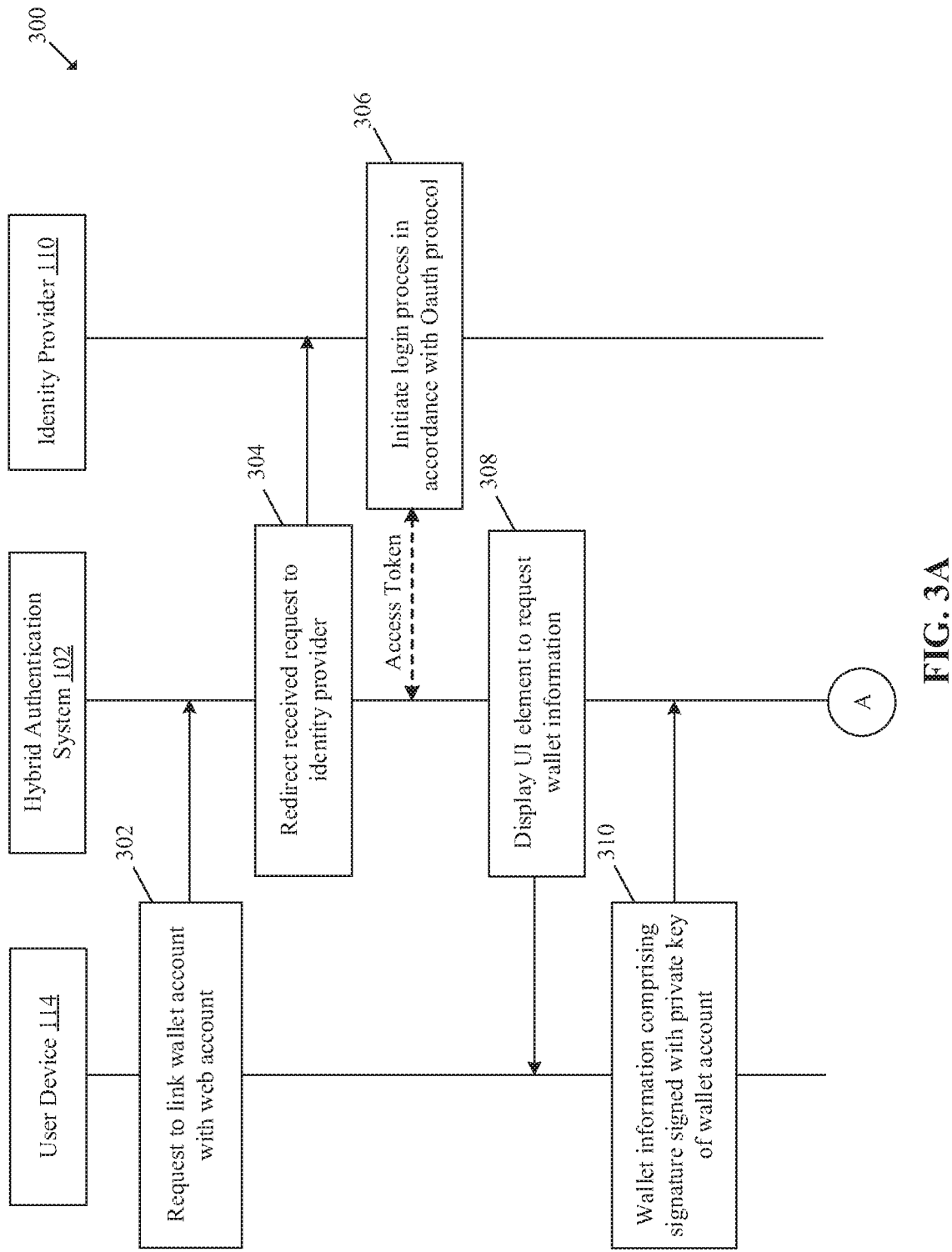
FIGS. 3A and 3B, collectively, illustrate a sequence diagram for linking web ID(s) a user's wallet account on a public ledger, in accordance with an embodiment of the disclosure.
Figure 3B:
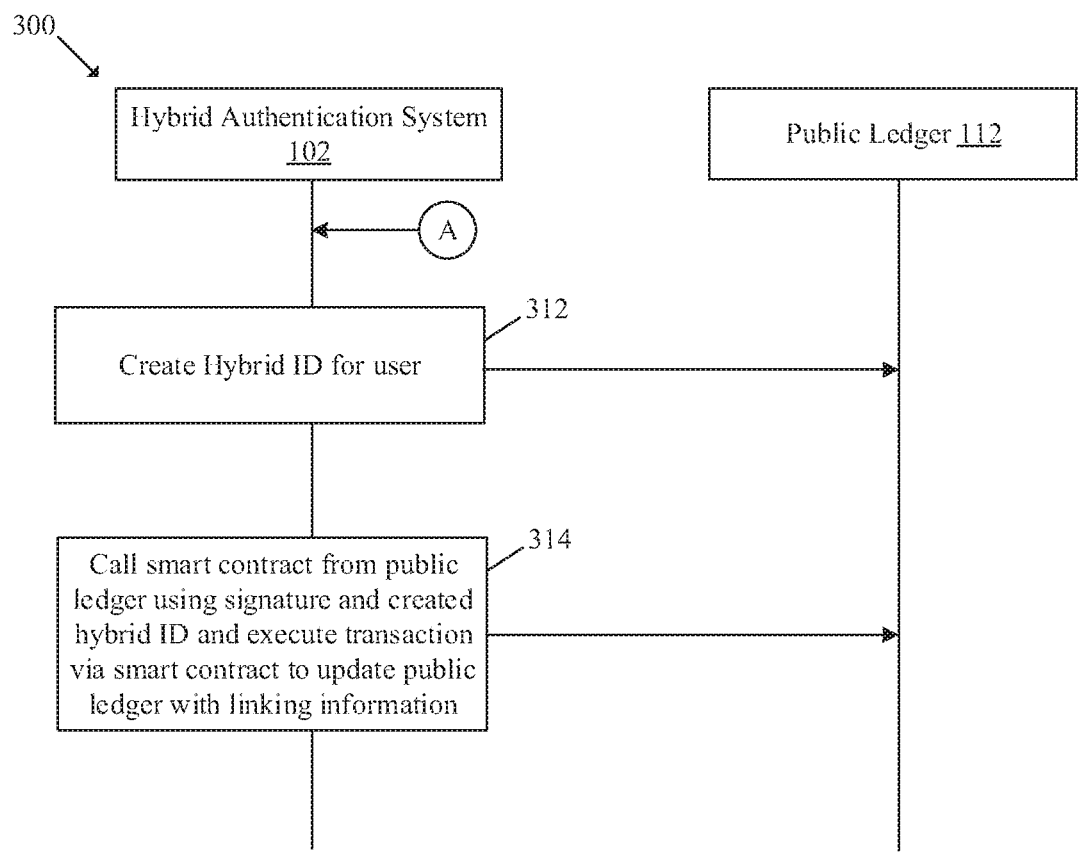

FIGS. 3A and 3B, collectively, illustrate a sequence diagram for linking web ID(s) with a user's wallet account on a public ledger, in accordance with an embodiment of the disclosure. FIGS. 3A and 3B are explained in conjunction with elements from FIG. 1 and FIG. 2. With reference to FIGS. 3A and 3B, there is shown a sequence diagram 300 that illustrates a method for linking a web-ID of the web account (managed by the identity provider 110) with the wallet account on the public ledger 112. The sequence of operations may be from 302 to 314 which may be executed by various elements of the network environment 100, such as the hybrid authentication system 102, the web application server 104, the identity provider 110, and the public ledger 112.

At 302, the web application server 104 may transmit a request to the hybrid authentication system 102. The request may be transmitted to link the wallet account of the user 118 with the web account (web ID) of the user 118 so that that user 118 may have SSO access to the web application 106 using one of or combination of the wallet account and the web ID (web account).

At 304, the hybrid authentication system 102 may be configured to redirect the received request to the identity provider 110 for authentication. For example, the hybrid authentication system 102 may check for validity of the request received from the web application server 104 and redirect to a defined Uniform Resource Indicator (URI) (or URL of a web page) of the identity provider 110.

At 306, the identity provider 110 may initiate a login process in accordance with the Oauth protocol. As part of the login process, an authorization page associated with the defined URI may be displayed on the user device 114. Suitable approval and/or login credentials may be requested via the authorization page so as to complete the login process to the web account of the user 118. As per the Oauth protocol, the hybrid authentication system 102 may receive an access token (also referred to as an Oauth token) from the identity provider 110 upon completion of the login process. The access token may be stored on the hybrid authentication system 102 for future requests for SSO access to web applications.

At 308, a UI element may be displayed on the user device 114 to request for wallet information associated with the wallet account of the user 118. The UI element may be a login page of the wallet account and may include fields or options where user 118 can provide user login credentials of the wallet account. Additionally, or alternatively, the UI element may include a page that may seek approval from the user 118 to register the wallet account for the wallet-based authentication option, to be offered by the hybrid authentication system 102.

At 310, the user device 114 may share the wallet information with the hybrid authentication system 102. The wallet information may include a signature which may be signed with a private key of the wallet account. Such wallet information may be obtained based on user inputs received via the UI element and may correspond to user-end authorization to register the wallet account so that the wallet account can be linked with the web ID associated with web account of the user 118.

At 312, the hybrid authentication system 102 may receive the wallet information from the user device 114 and create a hybrid ID for the user 118. The hybrid ID may include information that may indicate that the wallet account is linked with the web ID associated with the web account. For example, For user 1, a Hybrid ID1 may be generated as a record: linked to {wallet(1), wallet(2) web ID(1), . . . }, where wallet(1), wallet(2) may be represent identifiers for separate wallet accounts and web ID(1) may represent a particular web ID for the web account managed by the identity provider 110. Additionally, or alternatively, the hybrid ID may be create to link the wallet account to a plurality of web IDs for corresponding plurality of identity providers.

At 314, the hybrid authentication system 102 may call a smart contract from the public ledger 112 using the signature and the created hybrid ID and may execute a transaction via the smart contract to update the public ledger 112 with linking information for the wallet account and the web ID. By way of example, the transaction may include an operation to retrieve a public key of the wallet account from the signature and another operation to the link the public key of the wallet account with the hybrid ID. The hybrid authentication system 102 may store the hybrid ID, the public key for the wallet account (e.g., Ethereum Wallet Account), the web ID for the web account (e.g., a Social Media Account), and a user identifier as the linking information on the public ledger 112. The smart contract may control access to the linking information on the public ledger 112 for future requests from the hybrid authentication system 102.

Figure 4A:
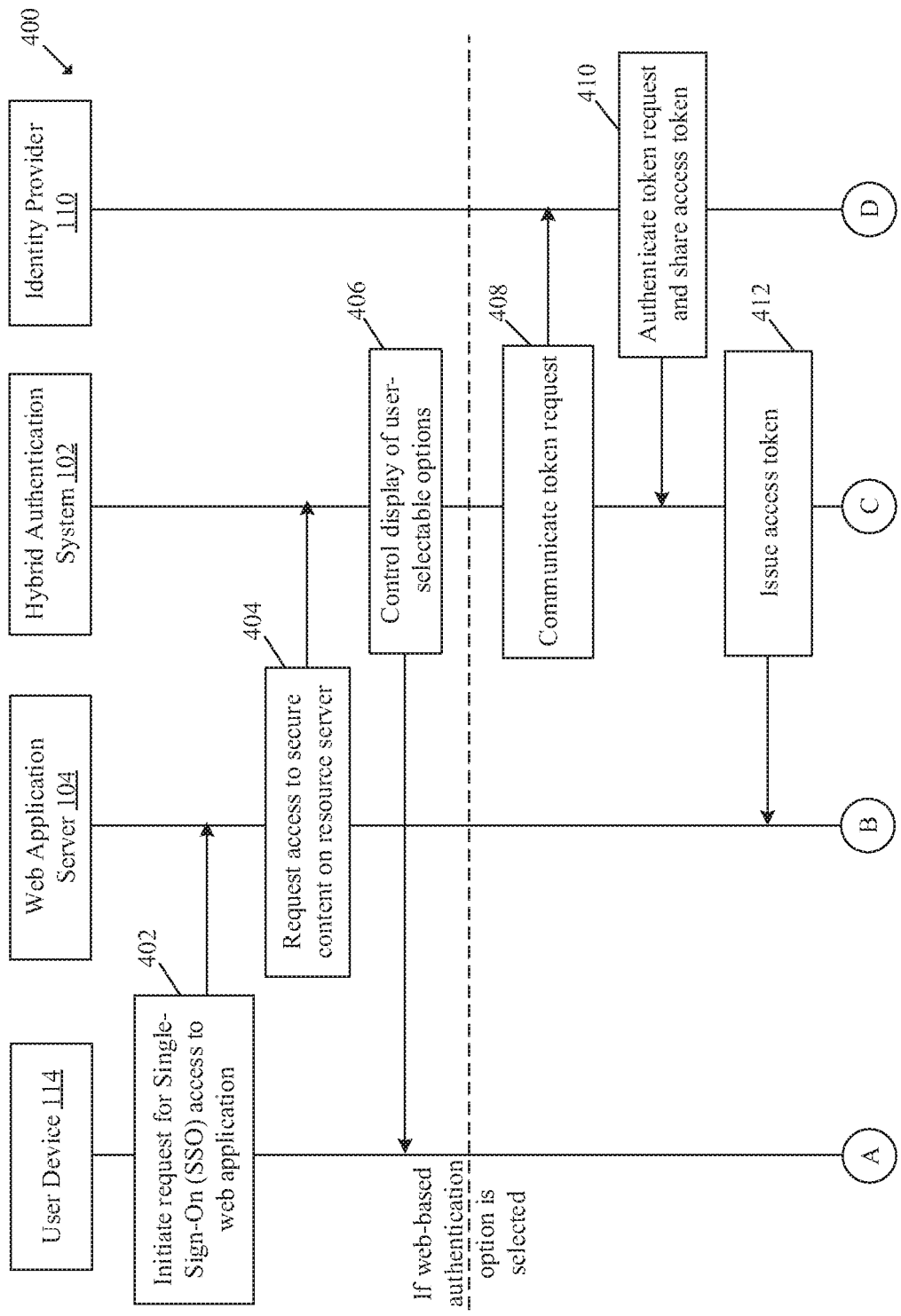
FIGS. 4A, 4B and 4C, collectively, illustrate a sequence diagram for SSO authentication via multiple authentication options, in accordance with an embodiment of the disclosure.
Figure 4B:
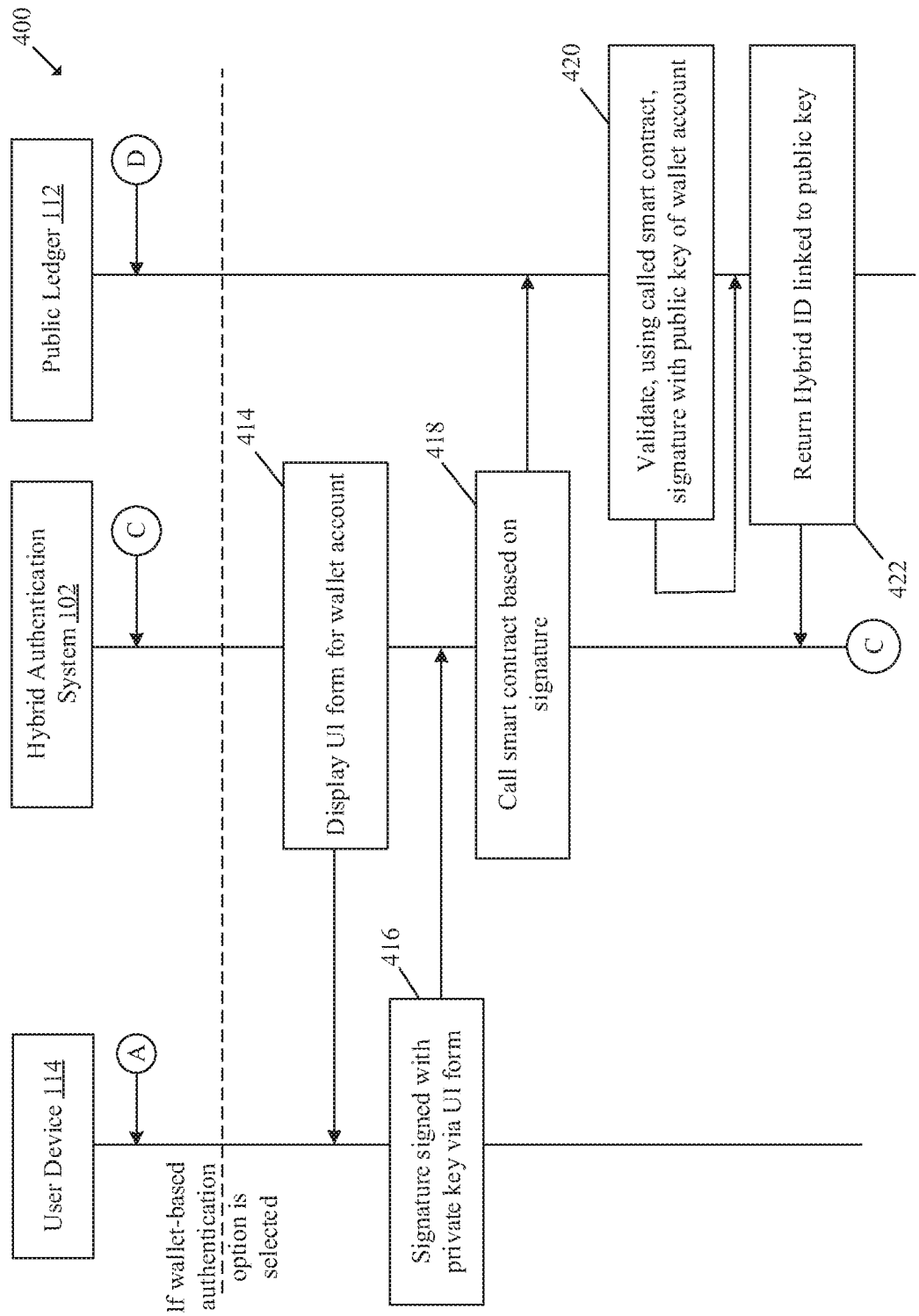
Figure 4C:
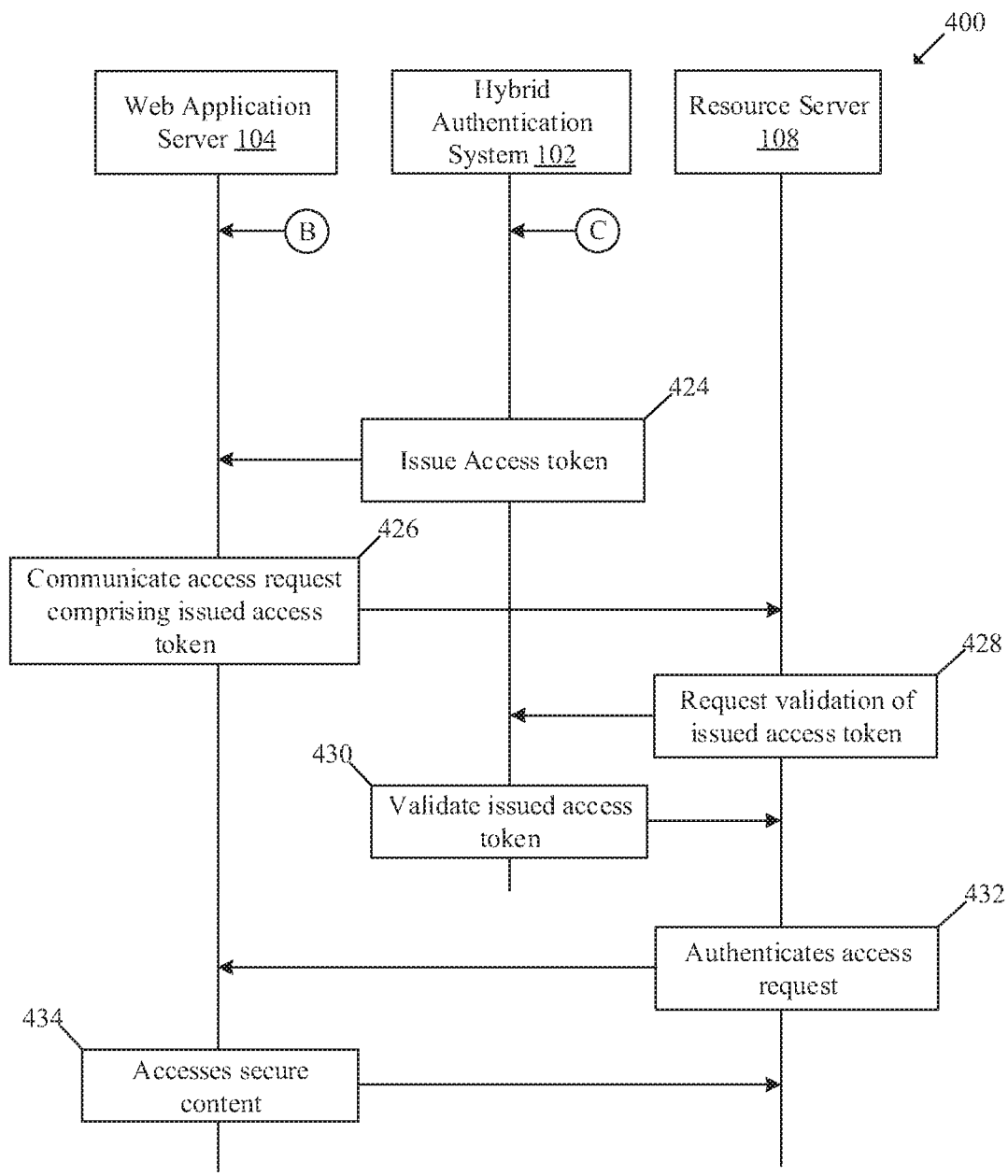

FIGS. 4A, 4B and 4C, collectively, illustrate a sequence diagram for SSO authentication via multiple authentication options, in accordance with an embodiment of the disclosure. FIGS. 4A, 4B, and 4C are explained in conjunction with elements from FIG. 1, FIG. 2, FIG. 3A, and FIG. 3B. With reference to FIGS. 4A, 4B, and 4C, there is shown a sequence diagram 400 that illustrates a method for SSO authentication via multiple authentication options. The sequence of operations may be from 402 to 434 and may be executed by various elements of the network environment 100, such as by the hybrid authentication system 102, the web application server 104, the resource server 108, the public ledger 112, and the user device 114.

At 402, the user device 114 may request for an SSO access to the web application 106 on the web application server 104. The request for the SSO access may be initiated by the user 118, via the web client 114a and may be communicated to the web application server 104.

At 404, the web application server 104 may request an access to the secure content 108a on the resource server 108. The request may be provided to the hybrid authentication system 102 based on the receipt of the user's request for SSO access to the web application 106. The access to the secure content 108a may be required to login the user 118 to the web application 106 and initialize a session of the web application 106 on the web client 114a of the user device 114.

At 406, the hybrid authentication system 102 may be configured to control display of a set of user-selectable options on the UI of the user device 114 based on the received request from the web application server 104. The set of user-selectable options may include the web-based authentication option and the wallet-based authentication option.

While the hybrid authentication system 102 may be waiting for a user input over the displayed set of user-selectable options, the hybrid authentication system 102 may access the defined security criteria for the web application 106 to determine authentication option(s) suitable for the web application 106. Based on a determination of suitable authentication-option(s), the hybrid authentication system 102 may initiate an authentication process as a response to the request from the web application server 104 to access the secure content 108a. In case the web-based authentication option is selected, a web-based authentication process may be initiated. Details of the web-based authentication process are provided from 408 to 412.

At 408, the hybrid authentication system 102 may communicate a token request to the identity provider 110 based on the selection of the web-based authentication option. The token request may include information which may be required by the identity provider 110 to verify the identity of the user 118.

At 410, the identity provider 110 may authenticate the token request and share the access token with the hybrid authentication system 102. In certain instances, before sharing the access token with the hybrid authentication system 102, the identity provider 110 may provide an authorization prompt on the user device 114 to seek approval of the user 118 and to verify that the token request is valid and not a malicious attempt to intercept the access token.

At 412, the hybrid authentication system 102 may issue the access token to the web application server 104. The access token may include a unique string which may represent that the bearer of the access token is authorized to access the resource server 108 and is allowed to execute specific operations (e.g., data retrieval) on the resource server 108, as per certain permissions for the access token.

In case the wallet-based authentication option is selected, a wallet-based authentication process may be initiated. Details of the wallet-based authentication process are provided from 414 to 424.

At 414, the hybrid authentication system 102 may display a UI form for the wallet account on the user device 114. The UI form may be displayed to collect the signature (e.g., a cryptographic signature in hex form) of the user 118 associated with the wallet account. For example, the UI form may include a wallet signature request message which may prompt the user 118 to sign the request message with the private key of the wallet account so as to prove that the user 118 has access to the wallet account and isn't a fraudulent user.

At 416, the user device 114 may collect the signature signed with the private key of the wallet account via the UI form and may share the signature with the hybrid authentication system 102.

At 418, the hybrid authentication system 102 may receive the signature via the UI form and call the smart contract (i.e. the smart contract called at 314) based on the received signature. Once a call is made to the smart contract, a validation process may be initiated on the public ledger 112 using the smart contract, as described herein.

At 420, the public ledger 112 may use the smart contract to validate the signature with the public key of the wallet account. For example, Elliptic Curve Digital Signature Algorithm (ECDSA) produces a signature that includes three parameters, namely, r, s, and v. As the smart contract runs on computational resources of the public ledger 112, the smart contract may call a public method (i.e. a recovery function) to recover an address from these three parameters. In case the recovered address matches with the public key (or a hash of the public key), the smart contract may determine the signature as valid. Thereafter, based on the validation of the received signature, the hybrid authentication system 102 may authenticate the request received from the web application server 104 to access the secure content 108a on the resource server 108.

At 422, the public ledger 112 may return the hybrid ID (e.g., the hybrid ID created at 312 of FIG. 3B) linked with the public key to the hybrid authentication system 102 based on the authentication of the received request. The returned hybrid ID may be linked with the public key and stored on the public ledger 112. Additionally, the returned hybrid ID may include identifiers which indicate that the web ID for the web account of the user 118 is linked to the wallet account.

At 424, the hybrid authentication system 102 may issue the access token (received at 306 of FIGS. 3A and 3B) to the web application server 104. In at least one embodiment, the hybrid authentication system 102 may also perform a check to determine if the access token is expired based on expiration time of the access token set by the identity provider 110. In case the access token is expired, the hybrid authentication system 102 may reinitiate the login process (at 306 of FIGS. 3A and 3B) using the Oauth protocol to request a new access token from the identity provider 110. After receiving the new access token, the hybrid authentication system 102 may issue the new access token to the web application server 104.

At 426, upon receiving the access token, the web application server 104 may communicate an access request including the access token to the resource server 108. The access request may be part of an API call or a token-exchange process to gain access to or to directly retrieve the secure content 108a on the resource server 108.

At 428, the resource server 108 may communicate a validation request for the access token to the hybrid authentication system 102. Such a validation request may include the access token which is used by the web application server 104 in the access request.

At 430, the hybrid authentication system 102 may receive, from the resource server 108, the validation request for the access token and may validate the access token based on the received validation request. For example, the hybrid authentication system 102 may compare the access token originally issued by the hybrid authentication system 102 with the access token shared by the resource server 108 in the validation request. The hybrid authentication system 102 may inform the resource server 108 about the validity of the access token.

At 432, the resource server 108 may authenticate the access request of the web application server 104 based on the validation of the issued access token and provide permissions to the web application server 104 to access the secure content 108a.

At 434, the web application server 104 may access, using the access token, the secure content 108a and initialize a session of the web application 106 on the web client 114a of the user device 114 based on the access to the secure content 108a. Additionally, the web application server 104 may assign a session ID to the initialized session, which may remain same as that for a web-based sign-in to the web application 106. The session ID may be specified in, for example, a cookie, a form field, or a Uniform Resource Locator (URL) on the web client 114a.

Figure 5:
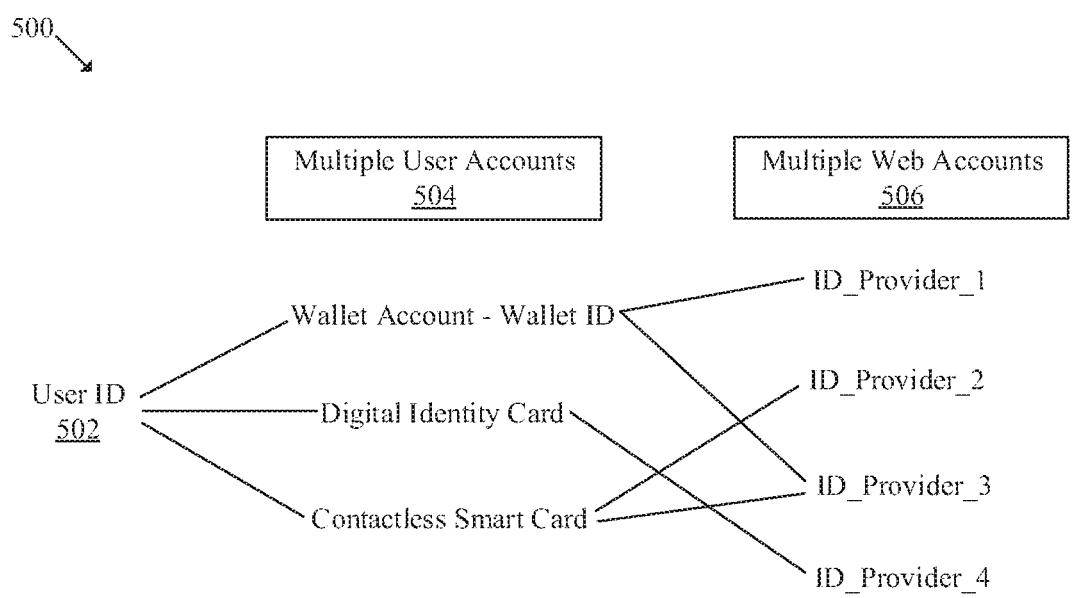
FIG. 5 is an example diagram that illustrates association among a user identifier, multiple user accounts, and multiple web accounts or multiple web-IDs, in accordance with an embodiment of the disclosure.

FIG. 5 is an example diagram that illustrates association among a user identifier, multiple user accounts, and multiple web accounts or multiple web-IDs, in accordance with an embodiment of the disclosure. FIG. 5 is explained in conjunction with elements from FIG. 1, FIG. 2, FIGS. 3A and 3B, and FIGS. 4A, 4B, and 4C. With reference to FIG. 5, there is shown an example diagram 500.

The example diagram 500 includes a user identifier 502, multiple user accounts 504, and multiple web accounts 506. As shown, the multiple user accounts 504 may include, for example, a wallet account with a particular wallet ID on the public ledger 112, a digital identity card, or a contactless smart card. Similarly, the multiple web accounts 506 may include, for example, an ID_Provider_1, an ID_Provider_2, an ID_Provider_3, and an ID_Provider_4. These multiple web accounts 506 may have respective web-IDs and may correspond to multiple identity providers who provide SSO-as-a-service to web applications that request access to secure content on respective resource servers, on behalf of a user.

An example of the multiple web accounts 506 and their respective type is provided in Table 4, as follows:

TABLE 4

Example of multiple web accounts

| Web Account | Type |
| --- | --- |
| ID_Provider_1 | Email-Service Provider |
| ID_Provider_2 | Social Media Network |
| ID_Provider_3 | Social Media Network |
| ID_Provider_4 | Email-Service Provider |

As shown, the user identifier 502, for example, an Email-ID, may be linked to each of the wallet account on the public ledger 112, the digital identity card, and the contactless smart card. The wallet account may be linked to the ID_Provider_1 and the ID_Provider_3. Similarly, the digital identity card may be linked to the ID_Provider_3 and the contactless identity card may be linked to the ID_Provider_2 and the ID_Provider_3. The multiple user accounts 504 may be owned by a single user and may allow a user to select a preferred user account and a preferred web account from the multiple user accounts 504 and the multiple web accounts 506, respectively. For example, a user input may be provided to select the wallet account on the public ledger 112 and the ID_Provider_3 as the identity provider 110 for SSO access to the web application 106, via the web client 114a on the user device 114.

Figure 6:
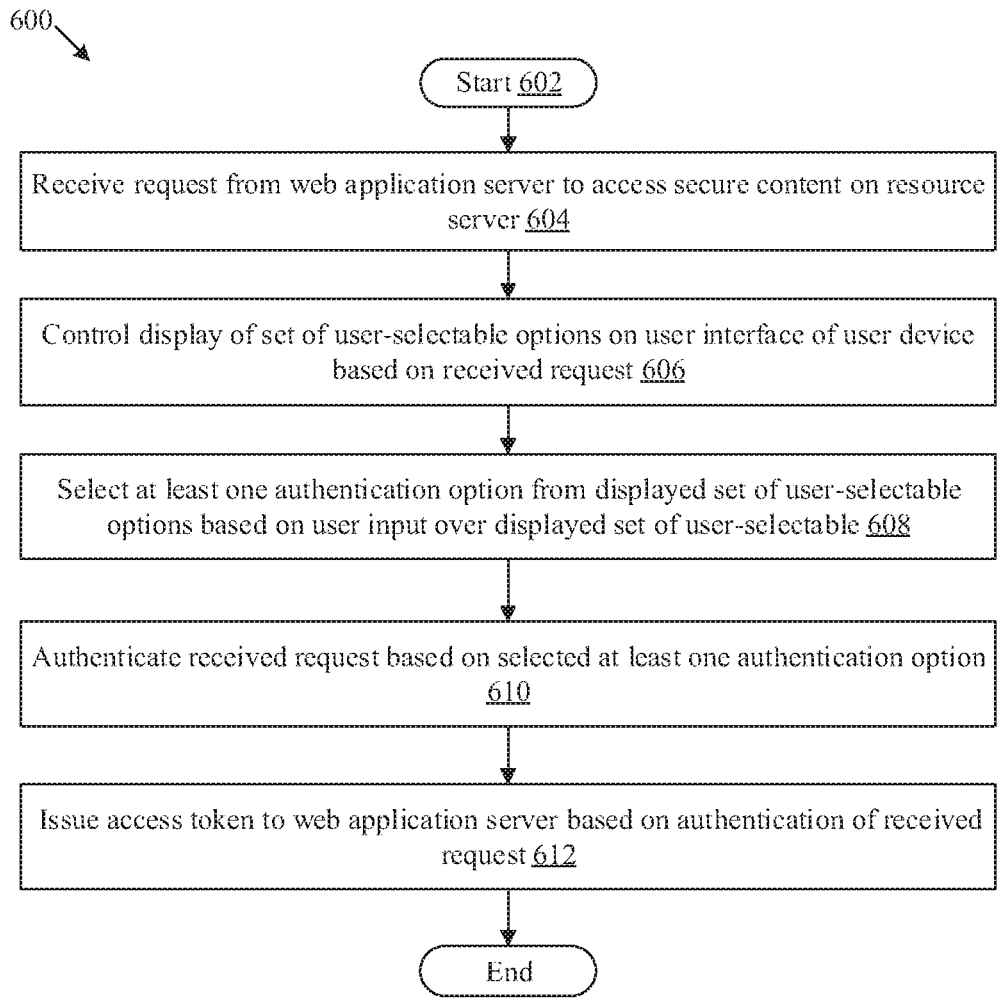
FIG. 6 is a flowchart that illustrates an exemplary method for SSO authentication via multiple authentication options, in accordance with an embodiment of the disclosure.

FIG. 6 is a flowchart that illustrates an exemplary method for SSO authentication via multiple authentication options, in accordance with an embodiment of the disclosure. FIG. 6 is described in conjunction with elements from FIGS. 1, 2, 3A, 3B, 4A, 4B, and 5. With reference to FIG. 6, there is shown a flowchart 600. The exemplary method of the flowchart 600 may be executed by any computing system, for example, by the hybrid authentication system 102 of FIG. 2. The exemplary method of the flowchart 600 may start at 602 and proceed to 604.

At 604, a request may be received from the web application server 104 to access the secure content 108a on the resource server 108. The hybrid authentication system 102 may be configured to receive the request from the web application server 104 to access the secure content 108a on the resource server 108. The request may be provided by the web application server 104 based on a user-initiated request for the SSO access to the web application 106.

At 606, display of a set of user-selectable options may be controlled on the UI of the user device 114 based on the received request. In at least one embodiment, the hybrid authentication system 102 may be configured to control the display of the set of user-selectable options on the UI of the user device 114. The set of user-selectable options may include the web-based authentication option and the wallet-based authentication option. The details of the web-based and the wallet-based authentication options are provided, for example, in FIGS. 1, 4A, 4B, and 4C.

At 608, one or more authentication options may be selected from the displayed set of user-selectable options based on a user input over the displayed set of user-selectable options. In at least one embodiment, the hybrid authentication system 102 may be configured to select the one or more authentication options from the displayed set of user-selectable options based on the user input.

At 610, the received request may be authenticated based on the selected one or more authentication options. In at least one embodiment, the hybrid authentication system 102 may be configured to authenticate the received request based on the selected one or more authentication options. Details of the authentication process are provided, for example, in FIGS. 1, 4A, 4B, and 4C.

At 612, the access token may be issued to the web application server 104 based on the authentication of the received request. In at least one embodiment, the hybrid authentication system 102 may be configured to issue the access token to the web application server 104 based on the authentication of the received request. Control may pass to end.

Various embodiments of the disclosure may provide a non-transitory, computer-readable medium and/or storage medium, and/or a non-transitory machine readable medium and/or storage medium stored thereon, instructions executable by a machine and/or a computer, such as a hybrid authentication system, for single-sign-on (SSO) authentication via multiple authentication options. The at least one code section may cause the machine and/or computer to perform operations that include reception of a request from a web application server to access secure content on a resource server. The operations further include a control of display of a set of user-selectable options on a user interface of a user device based on the received request. The set of user-selectable options may include a web-based authentication option and a wallet-based authentication option. The wallet-based authentication option may be based on a stored smart contract on a public ledger. The operations further include a selection of at least one authentication option from the displayed set of user-selectable options based on a user input over the displayed set of user-selectable options and authentication of the received request based on the selected at least one authentication option. The operations further include issuing an access token to the web application server based on the authentication of the received request.

Exemplary aspects of the disclosure may include the hybrid authentication system 102 that includes the control circuitry 202 communicatively coupled to the web application server 104 and the public ledger 112. The public ledger 112 may store a smart contract. The control circuitry 202 may be configured to receive a request from the web application server 104 to access the secure content 108a on the resource server 108. The control circuitry 202 may be further configured to control display of a set of user-selectable options on a user interface of the user device 114 based on the received request. The set of user-selectable options may include a web-based authentication option and a wallet-based authentication option. The wallet-based authentication option may be based on the stored smart contract on the public ledger 112. The control circuitry 202 may be further configured to select at least one authentication option from the displayed set of user-selectable options based on a user input over the displayed set of user-selectable options and authenticate the received request based on the selected at least one authentication option. Thereafter, the control circuitry 202 may be configured to issue an access token to the web application server 104 based on the authentication of the received request.

In accordance with an embodiment, the web application server 104 may host at least one web application and the web application server 104 provides the request based on a user-initiated request for an SSO access to the at least one web application. In accordance with an embodiment, the smart contract may be a self-executable program that controls access to linking information, which includes a public key for a wallet account of the user 118 on the public ledger 112, a web ID for a web account of the user 118, and a user identifier. In accordance with an embodiment, the resource server 108 may be an application-programming interface (API) server that stores user-specific information as the secure content 108a and is managed by an identity provider 110.

In accordance with an embodiment, the control circuitry 202 may be further configured to communicate a token request to the identity provider 110 based on the selected at least one authentication option including the web-based authentication option. The control circuitry 202 may receive the access token based on the authentication of the communicated token request and authenticate the received request based on the received access token for the selected web-based authentication option. Further, the control circuitry 202 may issue the received access token to the web application server 104 based on the authentication of the received request.

In accordance with an embodiment, the control circuitry 202 may be further configured to control display of a UI form on the user device 114 based on the selected at least one authentication option including the wallet-based authentication option. The control circuitry 202 may be further configured to receive a signature via the UI form and call the stored smart contract based on the received signature. The signature may be signed with a private key of the wallet account of the user 118 on the public ledger 112. The public ledger 112 may validate, using called smart contract, the received signature with a public key of the wallet account and authenticate the received request based on the validation of the received signature. The public ledger 112 may return a hybrid ID to the hybrid authentication system 102 based on the authentication of the received request. The returned hybrid ID may be linked with the public key and stored on the public ledger 112 and may include identifiers which indicate that the web ID for the web account of the user 118 is linked to the wallet account. The control circuitry 202 may be further configured to issue the access token to the web application server 104 based on the returned hybrid ID.

In accordance with an embodiment, the web application server 104 may communicate an access request including the issued access token to the resource server 108 and access, using the issued access token, the secure content 108a on the resource server 108 based on authentication of the communicated access request. The web application server 104 may initialize a session of the web application 106 on a web client 114a of the user device 114 based on the accessed secure content 108a and assign a session ID to the initialized session. The assigned session ID may remain same as that for a web-based sign-in to the web application.

In accordance with an embodiment, the control circuitry 202 may be further configured to receive, from the resource server 108, a validation request for the issued access token and may validate the issued access token based on the received validation request. The resource server 108 may authenticate the communicated access request based on the validation of the issued access token.

In accordance with an embodiment, the control circuitry 202 may be further configured to construct a user profile image based on the authentication of the received request. The user profile image may include an application URL for at least one web application hosted on the web application server 104, an authentication type, an identity provider 110 name, an expiration time pre-assigned to the access token, and a re-certification status.

In accordance with an embodiment, the control circuitry 202 may be configured to select the at least one authentication option from the displayed set of user-selectable options further based on defined security criteria for the web application 106 hosted on the web application server 104. The defined security criteria may include a defined security level, a user preference for an authentication option, or a failure status of the authentication attempted previously based on one of the web-based authentication option or the wallet-based authentication option.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims

What is claimed is:

1. A hybrid authentication system, comprising:
control circuitry communicatively coupled to a web application server and a public ledger that stores a smart contract associated with a user, wherein the control circuitry is configured to:
receive a request from the web application server to access secure content on a resource server;
control display of a set of user-selectable options on a user interface (UI) of a user device based on the received request, wherein
the set of user-selectable options comprises a web-based authentication option and a wallet-based authentication option, and
the wallet-based authentication option is based on the stored smart contract on the public ledger;
select at least one authentication option from the displayed set of user-selectable options based on a user input over the displayed set of user-selectable options;
communicate a token request to an identity provider based on the selected at least one authentication option comprising the web-based authentication option;
receive an access token based on authentication of the communicated token request;
authenticate the received request based on the received access token; and
issue the received access token to the web application server based on the authentication of the received request.

2. The hybrid authentication system according to claim 1, wherein
the web application server hosts at least one web application, and
the web application server provides the request based on a user-initiated request for a Single-Sign-On (SSO) access to the at least one web application.

3. The hybrid authentication system according to claim 1, wherein
the smart contract is a self-executable program that controls access to linking information comprising a public key, a web identifier (ID), and a user identifier,
the public key is for a wallet account of the user on the public ledger, and
the web ID is for a web account of the user.

4. The hybrid authentication system according to claim 1, wherein
the resource server is an application-programming interface (API) server that stores user-specific information as the secure content, and
the resource server is managed by the identity provider.

5. The hybrid authentication system according to claim 1, wherein the control circuitry is further configured to:
control display of a UI form on the user device based on the selected at least one authentication option comprising the wallet-based authentication option;
receive a signature via the UI form, wherein the signature is signed with a private key of a wallet account of the user on the public ledger; and
call the stored smart contract based on the received signature.

6. The hybrid authentication system according to claim 5, wherein the public ledger
validates, using the called smart contract, the received signature with a public key of the wallet account;
authenticates the received request based on the validation of the received signature; and
returns a hybrid ID to the hybrid authentication system based on the authentication of the received request, wherein
the returned hybrid ID is linked with the public key and stored on the public ledger, and
the hybrid ID comprises identifiers which indicate that a web identifier (ID) for a web account of the user is linked to the wallet account.

7. The hybrid authentication system according to claim 6, wherein the control circuitry is further configured to issue the access token to the web application server based on the returned hybrid ID.

8. The hybrid authentication system according to claim 1, wherein the web application server:
communicates an access request comprising the issued access token to the resource server,
accesses, using the issued access token, the secure content on the resource server based on authentication of the communicated access request;
initializes a session of a web application on a web client of the user device based on the accessed secure content; and
assigns a session ID to the initialized session, wherein the assigned session ID is same as that for a web-based sign-in to the web application.

9. The hybrid authentication system according to claim 8, wherein the control circuitry is further configured to:
receive, from the resource server, a validation request for the issued access token; and
validate the issued access token based on the received validation request, wherein the resource server authenticates the communicated access request based on the validation of the issued access token.

10. The hybrid authentication system according to claim 1, wherein
the control circuitry is further configured to construct a user profile image based on the authentication of the received request, and
the user profile image comprises an application Uniform Resource Locator (URL) for at least one web application hosted on the web application server, an authentication type, an identity provider name, an expiration time assigned to the issued access token, and a re-certification status.

11. The hybrid authentication system according to claim 1, wherein the control circuitry is further configured to select the at least one authentication option from the displayed set of user-selectable options based on a defined security criteria for a web application hosted on the web application server.

12. The hybrid authentication system according to claim 11, wherein the defined security criteria comprises at least one of
a defined security level,
a user preference for the at least one authentication option, or
a failure status of the authentication of the received request attempted previously based on one of the web-based authentication option or the wallet-based authentication option.

13. A method, comprising:
in a hybrid authentication system communicatively coupled to a web application server and a public ledger that stores a smart contract associated with a user:
receiving a request from the web application server to access secure content on a resource server;
controlling display of a set of user-selectable options on a user interface (UI) of a user device based on the received request, wherein
the set of user-selectable options comprises a web-based authentication option and a wallet-based authentication option, and
the wallet-based authentication option is based on the stored smart contract on the public ledger;
selecting at least one authentication option from the displayed set of user-selectable options based on a user input over the displayed set of user-selectable options;
communicating a token request to an identity provider based on the selected at least one authentication option comprising the web-based authentication option;
receiving an access token based on authentication of the communicated token request;
authenticating the received request based on the received access token; and
issuing the received access token to the web application server based on the authentication of the received request.

14. The method according to claim 13, further comprising:
controlling display of a UI form on the user device based on the selected at least one authentication option comprising the wallet-based authentication option;
receiving a signature via the UI form, wherein the signature is signed with a private key of a wallet account of the user on the public ledger; and
calling the stored smart contract based on the received signature.

15. The method according to claim 14, further comprising:
validating, by the public ledger, the received signature with a public key of the wallet account using the called smart contract;
authenticating, by the public ledger, the received request based on the validation of the received signature; and
returning, by the public ledger, a hybrid ID to the hybrid authentication system based on the authentication of the received request, wherein
the returned hybrid ID is linked with the public key and stored on the public ledger, and
the hybrid ID comprises identifiers which indicate that a web identifier (ID) for a web account of the user is linked to the wallet account.

16. The method according to claim 15, further comprising issuing the access token to the web application server based on the returned hybrid ID.

17. The method according to claim 13, further comprising selecting the at least one authentication option from the displayed set of user-selectable options based on a defined security criteria for a web application hosted on the web application server.

18. A non-transitory computer-readable medium having stored thereon, computer-executable instructions that when executed by a hybrid authentication system, causes the hybrid authentication system to execute operations, the operations comprising:
receiving a request from a web application server to access secure content on a resource server;
controlling display of a set of user-selectable options on a user interface (UI) of a user device based on the received request, wherein
the set of user-selectable options comprises a web-based authentication option and a wallet-based authentication option, and
the wallet-based authentication option is based on a smart contract stored on a public ledger;
selecting at least one authentication option from the displayed set of user-selectable options based on a user input over the displayed set of user-selectable options;
communicating a token request to an identity provider based on the selected at least one authentication option comprising the web-based authentication option;
receiving an access token based on authentication of the communicated token request;
authenticating the received request based on the received access token; and
issuing the received access token to the web application server based on the authentication of the received request.

19. A hybrid authentication system, comprising:
control circuitry communicatively coupled to a web application server and a public ledger that stores a smart contract associated with a user, wherein the control circuitry is configured to:
receive a request from the web application server to access secure content on a resource server;
control display of a set of user-selectable options on a user interface (UI) of a user device based on the received request, wherein
the set of user-selectable options comprises a web-based authentication option and a wallet-based authentication option, and
the wallet-based authentication option is based on the stored smart contract on the public ledger;

select at least one authentication option from the displayed set of user-selectable options based on a user input over the displayed set of user-selectable options;

authenticate the received request based on the selected at least one authentication option;

issue an access token to the web application server based on the authentication of the received request; and construct a user profile image based on the authentication of the received request, wherein the user profile image comprises an application Uniform Resource Locator (URL) for at least one web application hosted on the web application server, an authentication type, an identity provider name, an expiration time assigned to the issued access token, and a re-certification status.

* * * * *